Jan. 7, 1964  D. E. CLARK ET AL  3,116,898
VTO INLET
Filed March 23, 1962
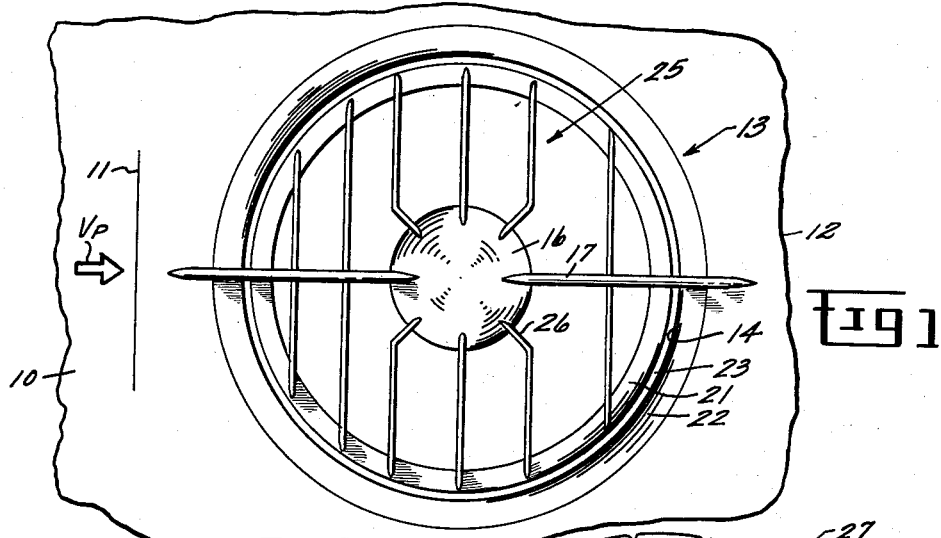
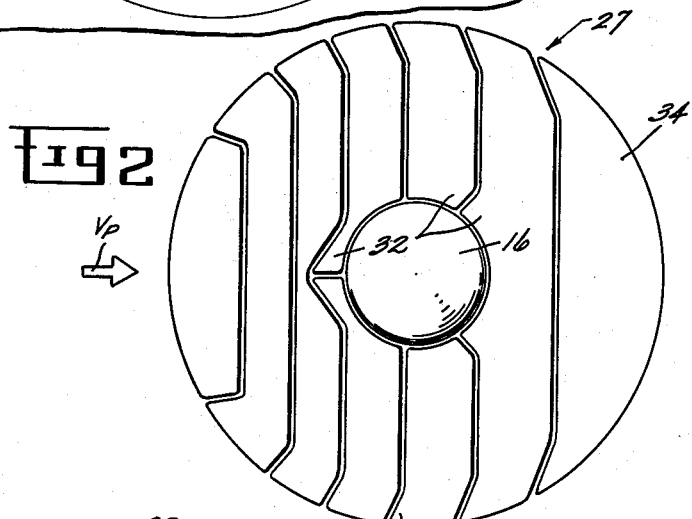
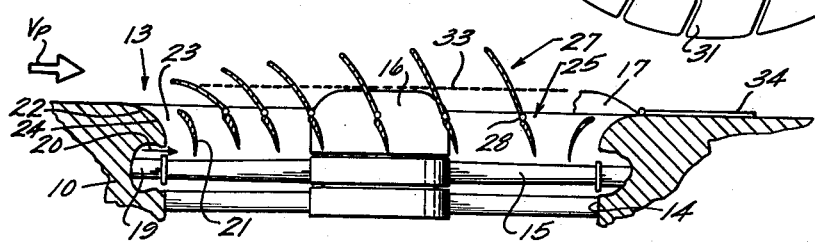
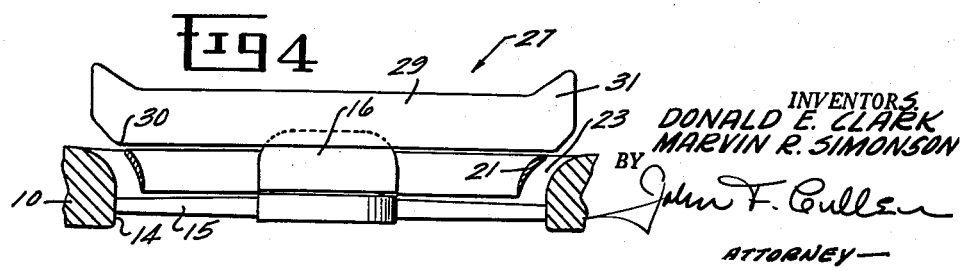
INVENTORS
DONALD E. CLARK
MARVIN R. SIMONSON
BY
ATTORNEY

United States Patent Office 3,116,898
Patented Jan. 7, 1964

3,116,898
VTO INLET
Donald E. Clark, Cincinnati, and Marvin R. Simonson, Fairfield, Ohio, assignors to General Electric Company, a corporation of New York
Filed Mar. 23, 1962, Ser. No. 181,973
8 Claims. (Cl. 244—23)

This invention relates to an inlet for a vertical take off aircraft designed for both vertical and horizontal flight, and more particularly, to an inlet for the lift fan for such an aircraft wherein optimum performance of the inlet is made possible in the vertical, hover, and transition portions of the flight.

In vertical take off aircraft in which fans for providing vertical lift are disposed in the wing, or if in the fuselage near the upper surface thereof, and mounted on an axis of rotation fixed in the direction of vertical flight, a problem exists of devising an inlet which provides optimum airflow through the fan duct for both vertical take off from a stationary condition, for hovering, and for the transition from vertical to horizontal or forward flight. For strictly vertical take off and hovering, the configuration of the inlet duct does not have to allow for a change of direction of the air drawn into the fan duct. For the transition from vertical flight to horizontal flight, and vice versa, the inlet must be capable of receiving high velocity air flowing over the surface, such as a wing, and subjecting it to a sudden substantially right angle change of direction into the fan axis. In making this sudden change of direction, air has a tendency to separate from the edge of the bellmouth comprising the fan inlet leaving a relatively low pressure or low density area in the vicinity of the bellmouth radius and causing consequent losses of effective inlet flow and distortion of the velocity field in the fan duct. These effects are deleterious to fan performance.

Since the fan inlet in the well known lift fan configuration of aircraft is closed during horizontal flight the inlet must be designed to satisfy two objectives. First, it must have good hover performance and second, it must provide good performance in transition from vertical to horizontal flight. It is well known that drawing air into an inlet with a change of flow direction is best accomplished by providing the inlet with a bellmouth having a radius of curvature which is relatively large. This may be expressed in terms of a ratio known as the "bellmouth radius ratio" which is the ratio of the radius of the curvature of the bellmouth to the diameter of the inlet. Thus an inlet having a bellmouth ratio of fifty percent can more easily draw air into it than can an inlet having a bellmouth ratio of ten percent. In thin wing installations, because of space limitations, it is desirable to have as sharp a radius of curvature as possible consistent with good performance. Thus, the bellmouth ratio is preferably kept low. However, because of space limitations, where large radiuses cannot be used in a thin wing installation, problems are created and specific structure must be employed to cause the air to flow properly with high efficiency.

The object of the present invention is to provide an improved fan inlet duct for vertical take off aircraft.

Another object of the invention is to provide an inlet for the fan duct of a vertical take off aircraft which provides satisfactory airflow through the duct when the aircraft is stationary or in vertical flight as well as in the transition portion with high velocity air flowing over the inlet surface and using the guiding structure of the inlet as a closure for the inlet when not in use.

Another object of this invention is to provide an inlet for a fan duct of a vertical take off aircraft which prevents separation of the airflow from the walls of the inlet, reduces distortion, and eliminates the blade excitation and stalling due to the advancing-retreating blade loading on the fan.

A further object is to provide such an inlet for vertical take off aircraft which uses a specific articulated blade structure designed to reduce stalled operation of the compressor stage.

Briefly, and in accordance with the invention, a bellmouth fan inlet to a duct through an aircraft is provided for a lift fan located generally near the upper surface of the inlet. A means to support a fan within the duct is provided by a bulletnose or its equivalent disposed centrally in the duct. Extending around the duct is a concentric airfoil vane that is spaced from the bellmouth to provide a passage between and to assist in turning the air to prevent separation from the bellmouth. A plurality of fixed spaced airfoil vanes is disposed in the duct above the fan and arranged transversely to the direction of horizontal flight. These vanes are secured at their ends to the concentric vane. A second plurality of movable transverse vanes directly above the fixed vanes are hinged to the fixed vanes and extend completely over the duct and beyond the concentric vane. These movable vanes form, with the fixed vanes, an articulated structure for directing airflow into the fan and the movable vanes are used to close the inlet. Both sets of vanes have shaped portions to reduce distortion.

While the specification concludes with claims particularly pointing out and distinctly claiming the subject matter which we regard as our invention, it is believed the invention will be better understood from the following description taken in connection with the accompanying drawing in which:

FIGURE 1 is a partial view in plan of an aircraft wing having therein a fan duct inlet of the present invention and showing the fixed blades;

FIGURE 2 is a similar view, without the wing structure, showing the movable vanes;

FIGURE 3 is a partial sectional view taken through the duct showing both sets of vanes; and, FIGURE 4 is a partial sectional view through the duct at right angles to FIGURE 3 showing the concentric vane only with the movable transverse vanes and illustrating the particular shape of the movable vanes at the ends thereof.

The present invention is another modification of an inlet vane arrangement for a VTO aircraft from that shown in U.S. Patent 3,088,695 assigned to the assignee of the instant invention.

Referring first to FIGURE 1, a fragmentary portion of an aircraft is shown having a wing 10 with a leading edge 11 and a trailing edge 12 and having therein a bellmouth fan inlet generally indicated at 13 forming part of and leading to a duct 14 through wing 10. As seen in FIGURE 3, this structure is designed to hold a fan 15 for movement of air through the duct from the upper surface to the lower surface of the wing and to provide vertical lift thereto.

In order to support the fan, a bulletnose member 16 or its equivalent, is disposed centrally of the duct and supported by suitable strut means 17 from the wing structure. The bulletnose contains bearing means, not shown, about which the fan 15 rotates. The fan is a tip turbine fan, as partially shown in FIGURE 3, wherein turbine blades 19 are fed by exhaust gases to drive the fan by well known means not forming part of the present invention. The structure thus far described, is well known, and provides the setting for the instant invention.

In such a VTO inlet in a wing installation, the bellmouth will normally have a sharp radius because of space limitations due to the thinness of the wing. This results in separation of the incoming air from the surface described by the radius of the bellmouth. In addition, separation is encouraged by any tip leakage from the area of the turbine buckets into the duct as may be seen at arrow 20 in FIGURE 3. In order to cure this static problem of air separation over the bellmouth, there is provided an airfoil shaped vane 21 that is concentric with the duct and disposed in the bellmouth to extend completely around the bellmouth as seen in FIGURES 1 and 3. This vane is oriented with its leading edge upward and into the airflow Vp and is placed substantially parallel to and contiguous with the bellmouth radius as seen in FIGURE 3. While this vane is primarily to cure the static problem of air separation it also operates in the transition portion of the flight by reducing the tendency of the leading edge lip of the airstream from separating as it passes over the bellmouth radius generally shown at 13 in FIGURE 3. Thus, this completely continuous vane is advantageous in both the hovering and the transition portion. In order for vane 21 to operate efficiently and keep the losses low, it is arranged substantially parallel to and contiguous with the surface of the bellmouth as generated by radius 22 as seen in FIGURE 3. The vane leading edge extends into the airstream substantially flush with the upper surface of the wing or bellmouth although will, in actuality, be disposed slightly below the surface as shown in FIGURE 3 so that the upper vanes, to be described, may cover the inlet duct during forward flight. Vane 21 preferably extends the full length of the bellmouth surface and slightly beyond as shown in FIGURE 3 in order to capture and funnel through the fan any seal leakage from the exhaust gas area at 20. Thus, it can be seen that the vane 21 defines a substantially constant annular area passage 23 between the vane and the bellmouth. In addition, the vane being substantially flush with the surface, is intended to follow the contours of the wing surface around the inlet. Since the maximum velocity peak of the incoming air occurs on the bellmouth radius at a point 24 (which is on the bellmouth surface at a point about 45 degrees from the horizontal plane) the extending of the vane over the complete bellmouth surface and the essentially constant area passage reduces the peak velocity that occurs at this point and prevents the bellmouth separation.

The term "solidity ratio" is used herein. Such ratio is defined in said referenced patent and need not herein be further defined other than to state that it is a ratio of how many vanes are used in a given space. Thus, the higher the solidity ratio the more vanes are used. Further, a solidity ratio that increases merely means that the vanes are closer together in the direction of the increase.

In the transition portion with both vertical lift and forward motion, additional inlet flow distortion occurs which is not desirable. As fan 15 rotates and the aircraft moves forward the fan blade moving in the direction of flight receives a heavier loading than static conditions and the retreating blade a lighter loading. This is a well known phenomenon of helicopters and occurs because the angle of attack on the blade is changing and this is the reason that helicopter blades are provided with pitch control. The constant loading and unloading of the fan blades as they turn results in a pulsing vibration on the rotor resulting in mechanical complications as well as aerodynamic complications. In other words, the rotating fan blade is subjected to an impulse for each revolution. In order to diminish the magnitude of this rotor blade excitation it is desirable to do something to remove the advancing component of the flight velocity and this is accomplished by the introduction of fixed vanes generally indicated at 25. As can be seen from FIGURE 1, vanes 25 comprise a plurality of fixed spaced vanes that extend across the inlet transverse to the direction of horizontal flight and above the fan and these are oriented with their leading edges into the air flow. These vanes are preferably parallel as shown and extend across the complete inlet and are secured at their ends to the concentric vane 21 and to the bulletnose 16 where the bulletnose would interfere with their passage. The vanes occupy said inlet with a solidity ratio that increases in the forward direction as shown in FIGURE 1. In other words, the vanes get closer together as they progress towards the leading edge 11 as seen in FIGURE 1. These vanes are designed to remove most of the component of the cross-load on the sides of the fan where the loading is the most critical and reduce the advancing and retreating blade type load variation. They unload the heavily loaded advancing part of the fan and load up the retreating part of the fan to remove the impulse and reduce vibration and to correct the angle of attack to prevent stall. It is to be noted that these vanes do not extend into passage 23 between the concentric vane and the bellmouth radius to reduce distortion. Also, the boundary layer on vane 21 is thinner than at the radius of the bellmouth and lower loss is encountered in turning the air into the duct. To further reduce distortion, those vanes which would normally intersect the bulletnose 16 are provided with a radial portion 26 at their inner ends to provide a radial intersection with the bulletnose.

Combined with the fixed vanes thus far described, is a second set of movable vanes 27 shown in FIGURES 2 and 3 and cooperating with fixed vanes 25 in a manner to be described. This plurality of movable transverse vanes is disposed above fixed vanes 25, one above each vane, and consists of airfoils with the leading edge directed into the airflow and each vane 27 is hinged at 28 to the lower fixed vane. Thus, an articulated vane structure is provided comprising the upper movable vanes 27 and the lower fixed vanes 25. The individual articulated airfoils turn the airflow into an axial direction to the fan and vanes 27 are intended to provide a closure when the fan is inoperative. Both sets of vanes are generally aligned in a vertical direction as shown in FIGURE 3 to direct the air axially into the fan. Hinge 28 thus occurs at the trailing edge of the upper vanes 27 and at the leading edge of the lower vanes 25.

Referring now to FIGURE 4, it can be seen that the individual transverse movable vane 29 extends beyond the ends of the fixed vanes which are secured at their ends to concentric vane 21 and therefore movable vane 29 extends outwardly of the periphery of the concentric vane 21. This radial extension 30 is to extend the movable vane ends beyond the periphery of and over the concave side of concentric vane 21 so that distortion from the ends of the movable vanes is fed onto the concave side of concentric vane 21 which is the pressure side of the vane. This pressure side is the preferable side to take the vortex distortion from the tips of vane 29 rather than the convex suction side of vane 21.

In order to reduce distortion and permit the upper vanes 27 to completely close the opening to the duct 14, the ends of vanes 27 are angled outwardly as shown at 31 in FIGURES 2 and 4. Again, this outward angling of vanes 27 at the ends is for the purpose of putting any tip distortion on the pressure side of concentric vane 21 and away from the bellmouth radius resulting in lower losses. Similarly, those movable vane ends that intersect at the bulletnose 16 are similarly angled outwardly as shown at 32 in FIGURE 2 for the same purpose.

In order to close the duct inlet completely during forward flight, a suitable linkage generally indicated at 33 in FIGURE 3 may be used to actuate the movable portion of the articulated vanes. Furthermore, the individual movable vanes 27 are connected to the fixed vanes 25 so that the camber of the articulated structure progressively increases in the forward direction as clearly shown in FIGURE 3. The articulated structure is arranged with the high loading toward the trailing edge or the fixed vanes 25 so that a minimum amount of curvature is present in the movable vanes 27. The purpose of this is so that the movable portion of the articulated airfoil can be made as close as possible to the wing surface and thus form a continuation of the wing. The increase in camber in the forward direction is due to the fact that the desired streamline flow is more curved in the leading edge region and therefore the meanline of the individual articulated structure is more curved.

It will be noted that, with the structure described, it is impossible to close a small segment at the trailing edge of the opening and, for this purpose, any suitable closure 34 may be used to close the segment. 34 is intended to be diagrammatic only and may be pivoted as shown or a sliding closure.

While we have hereinbefore described a preferred form of our invention, obviously many modifications and variations of the present invention are possible in the light of the above teachings. It is therefore to be understood that within the scope of the appended claims, the invention may be practiced otherwise than as specifically described.

We claim:

1. In a vertical take off aircraft having a bellmouth fan inlet duct through a wing thereof for a lift fan,
    a bulletnose disposed centrally of said duct for support of said fan,
    an airfoil vane concentric with and disposed in said bellmouth above said fan and substantially parallel to and contiguous with the surface of said bellmouth and spaced therefrom forming a passage,
    a plurality of fixed spaced airfoil vanes in said duct above said fan disposed transverse to the direction of horizontal flight and secured to said concentric vane,
    said fixed vanes being aligned in a generally vertical direction to direct air axially into said fan,
    a plurality of movable transverse airfoil vanes above said fixed vanes and hinged at the trailing edge thereof to the leading edges of said fixed vanes to form an articulated vane therewith,
    said movable vanes extending outwardly of the periphery of said concentric vane,
    and means to move said movable vanes about said hinges to close said duct and form a continuation of said wing.

2. Apparatus as described in claim 1 wherein said fixed and movable vanes occupy said inlet with a solidity ratio increasing in the forward direction.

3. Apparatus as described in claim 1 wherein said movable vanes form with said fixed vanes a progressively larger camber increasing in the forward direction.

4. Apparatus as described in claim 1 wherein said movable vanes angle outwardly at the ends thereof.

5. Apparatus as described in claim 1 wherein said movable vanes intersecting said bulletnose are angled outwardly at said intersection and,
    all said movable vanes are angled outwardly at the outer ends thereof.

6. Apparatus as described in claim 1 wherein said fixed vanes intersecting said bulletnose are formed with a radial intersection therewith.

7. In a vertical take off aircraft having,
    a bellmouth fan inlet duct therethrough for a lift fan,
    a bulletnose disposed centrally of said duct for support of said fan,
    an airfoil vane concentric with and disposed in said bellmouth above said fan and substantially parallel to and contiguous with the bellmouth surface and spaced therefrom forming a passage,
    said vane extending at least the full length of the bellmouth surface,
    a plurality of fixed spaced airfoil vanes in said duct above said fan disposed transverse to the direction of horizontal flight and secured to said concentric vane,
    a plurality of movable transverse vanes above said fixed vanes and hinged to said fixed vanes and extending over said duct,
    said movable vanes extending beyond the ends of said fixed vanes and angling outwardly at the ends thereof,
    and means to move said movable vanes to close said duct.

8. Apparatus as described in claim 7 wherein said movable vanes that intersect said bulletnose are also angled outwardly at said intersection.

References Cited in the file of this patent

FOREIGN PATENTS

| | | |
|---|---|---|
| 217,315 | Australia | June 5, 1958 |
| 1,186,372 | France | Feb. 23, 1959 |
| (Corresponding U.S. 3,054,578, Sept. 18, 1962) | | |
| 1,187,201 | France | Mar. 2, 1959 |
| 1,118,017 | Germany | Nov. 23, 1961 |